United States Patent
Lin et al.

(10) Patent No.: US 9,575,893 B2
(45) Date of Patent: Feb. 21, 2017

(54) SNOOP FILTER FOR MULTI-PROCESSOR SYSTEM AND RELATED SNOOP FILTERING METHOD

(71) Applicant: MEDIATEK INC., Hsin-Chu (TW)

(72) Inventors: Chien-Hung Lin, Hsinchu (TW); Wei-Hao Chiao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 70 days.

(21) Appl. No.: 14/820,571

(22) Filed: Aug. 7, 2015

(65) Prior Publication Data
US 2016/0117249 A1    Apr. 28, 2016

Related U.S. Application Data

(60) Provisional application No. 62/066,923, filed on Oct. 22, 2014.

(51) Int. Cl.
*G06F 12/08*      (2016.01)

(52) U.S. Cl.
CPC ....... *G06F 12/0815* (2013.01); *G06F 12/0842* (2013.01); *G06F 2212/1021* (2013.01); *G06F 2212/283* (2013.01); *G06F 2212/608* (2013.01)

(58) Field of Classification Search
None
See application file for complete search history.

(56) References Cited

U.S. PATENT DOCUMENTS

| | | | | |
|---|---|---|---|---|
| 2013/0042078 A1* | 2/2013 | Jalal | ................... | G06F 12/0815 711/146 |
| 2016/0062889 A1* | 3/2016 | Salisbury | ............ | G06F 12/0831 711/146 |
| 2016/0062890 A1* | 3/2016 | Salisbury | ............ | G06F 12/0815 711/146 |
| 2016/0062893 A1* | 3/2016 | Tune | ................... | G06F 12/0833 711/135 |

OTHER PUBLICATIONS

Moshovos, RegionScout: Exploiting Coarse Grain Sharing in Snoop-Based Coherence, 2005 IEEE.

* cited by examiner

*Primary Examiner* — Kevin Verbrugge
(74) *Attorney, Agent, or Firm* — Winston Hsu; Scott Margo

(57) ABSTRACT

A snoop filter for a multi-processor system has a storage device and a control circuit. The control circuit manages at least a first-type entry and at least a second-type entry stored in the storage device. The first-type entry is configured to record information indicative of a first cache of the multi-processor system and first requested memory addresses that are associated with multiple first cache lines each being only available in the first cache. The second-type entry is configured to record information indicative of multiple second caches of the multi-processor system and at least a second requested memory address that is associated with a second cache line being available in each of the multiple second caches.

24 Claims, 13 Drawing Sheets

SNOOP FILTER FOR MULTI-PROCESSOR SYSTEM AND RELATED SNOOP FILTERING METHOD

CROSS REFERENCE TO RELATED APPLICATIONS

This application claims the benefit of U.S. provisional application No. 62/066,923, filed on Oct. 22, 2014 and incorporated herein by reference.

BACKGROUND

The present invention relates to a multi-processor system, and more particularly, to a snoop filter for a multi-processor system and a related snoop filtering method.

A multi-processor system becomes popular nowadays due to increasing need of computing power. In general, each processor in the multi-processor system often has its dedicated cache to improve efficiency of memory access. To make processors share memory space, a cache coherency interconnect may be implemented in the multi-processor system to manage cache coherency between these caches dedicated to different processors. Snooping based cache coherence is a widely adopted mechanism in the coherent interconnect. For example, if a cache miss event occurs in a cache, the snooping mechanism is operative to snoop other caches to check if they have the requested cache line. However, most applications have few shared data. That means a large amount of snooping is unnecessary. The unnecessary snooping intervenes with the operations of the snooped caches, resulting in performance degradation of the whole system. Further, the unnecessary snooping also results in redundant power consumption.

A snoop filter may be implemented in the cache coherency interconnect to prevent these unnecessary snooping operations. For example, a conventional directory-based snoop filter may be used to keep a directory for all lines of the shared memory caches. In other words, by checking the snoop filter first, the unnecessary snooping operations can be filtered, hence the system performance is improved and the power consumption is reduced. However, the conventional directory-based snoop filter requires a large-sized memory to record all cache lines existing in the shared memory caches, which results in higher production cost. Thus, there is a need for an innovative cost-effective snoop filter design with relaxed memory requirement.

SUMMARY

One of the objectives of the claimed invention is to provide a snoop filter for a multi-processor system and a related snoop filtering method.

According to a first aspect of the present invention, an exemplary snoop filter for a multi-processor system is disclosed. The exemplary snoop filter includes a storage device and a control circuit. The control circuit is arranged to manage at least a first-type entry and at least a second-type entry stored in the storage device, wherein the first-type entry is configured to record information indicative of a first cache of the multi-processor system and first requested memory addresses that are associated with multiple first cache lines each being only available in the first cache; and the second-type entry is configured to record information indicative of multiple second caches of the multi-processor system and at least a second requested memory address that is associated with a second cache line being available in each of the multiple second caches.

According to a second aspect of the present invention, an exemplary snoop filter for a multi-processor system is disclosed. The exemplary snoop filter includes a storage device and a control circuit. The storage device includes a plurality of configurable entries. The control circuit is arranged to adaptively configure at least one configurable entry as at least one first-type entry with a first data structure and adaptively configure at least one configurable entry as at least one second-type entry with a second data structure different from the first data structure, wherein the at least one first-type entry and the at least one second-type entry are arranged to record statuses of cache lines available in caches of the multi-processor system.

According to a third aspect of the present invention, an exemplary snoop filter for a multi-processor system is disclosed. The exemplary snoop filter includes a storage device and a control circuit. The control circuit is arranged to manage a plurality of entries stored in the storage device, wherein the entries are arranged to record statuses of cache lines available in caches of the multi-processor system, the entries comprise at least a first entry and a second entry, the first entry is stored in the storage device according to a first entry placement, the second entry is stored in the storage device according to a second entry placement, and the first entry placement and the second entry placement have same or different associativity.

According to a fourth aspect of the present invention, an exemplary snoop filtering method employed by a multi-processor system is disclosed. The exemplary snoop filtering method includes: recording at least a first-type entry in a storage device, wherein the first-type entry is configured to record information indicative of a first cache of the multi-processor system and first requested memory addresses that are associated with multiple first cache lines each being only available in the first cache; and recording at least a second-type entry in the storage device, wherein the second-type entry is configured to record information indicative of multiple second caches of the multi-processor system and at least a second requested memory address that is associated with a second cache line being available in each of the multiple second caches.

According to a fifth aspect of the present invention, an exemplary snoop filtering method for a multi-processor system is disclosed. The exemplary snoop filtering method includes: utilizing a storage device that includes a plurality of configurable entries; adaptively configuring at least one configurable entry as at least one first-type entry with a first data structure; and adaptively configuring at least one configurable entry as at least one second-type entry with a second data structure different from the first data structure. The at least one first-type entry and the at least one second-type entry are arranged to record statuses of cache lines available in caches of the multi-processor system.

According to a sixth aspect of the present invention, an exemplary snoop filtering method for a multi-processor system is disclosed. The exemplary snoop filtering method includes: recording a plurality of entries in a storage device, wherein the entries are arranged to record statuses of cache lines available in caches of the multi-processor system, the entries comprise at least a first entry and a second entry, the first entry is stored in the storage device according to a first entry placement, the second entry is stored in the storage device according to a second entry placement, and the first entry placement and the second entry placement have same or different associativity.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
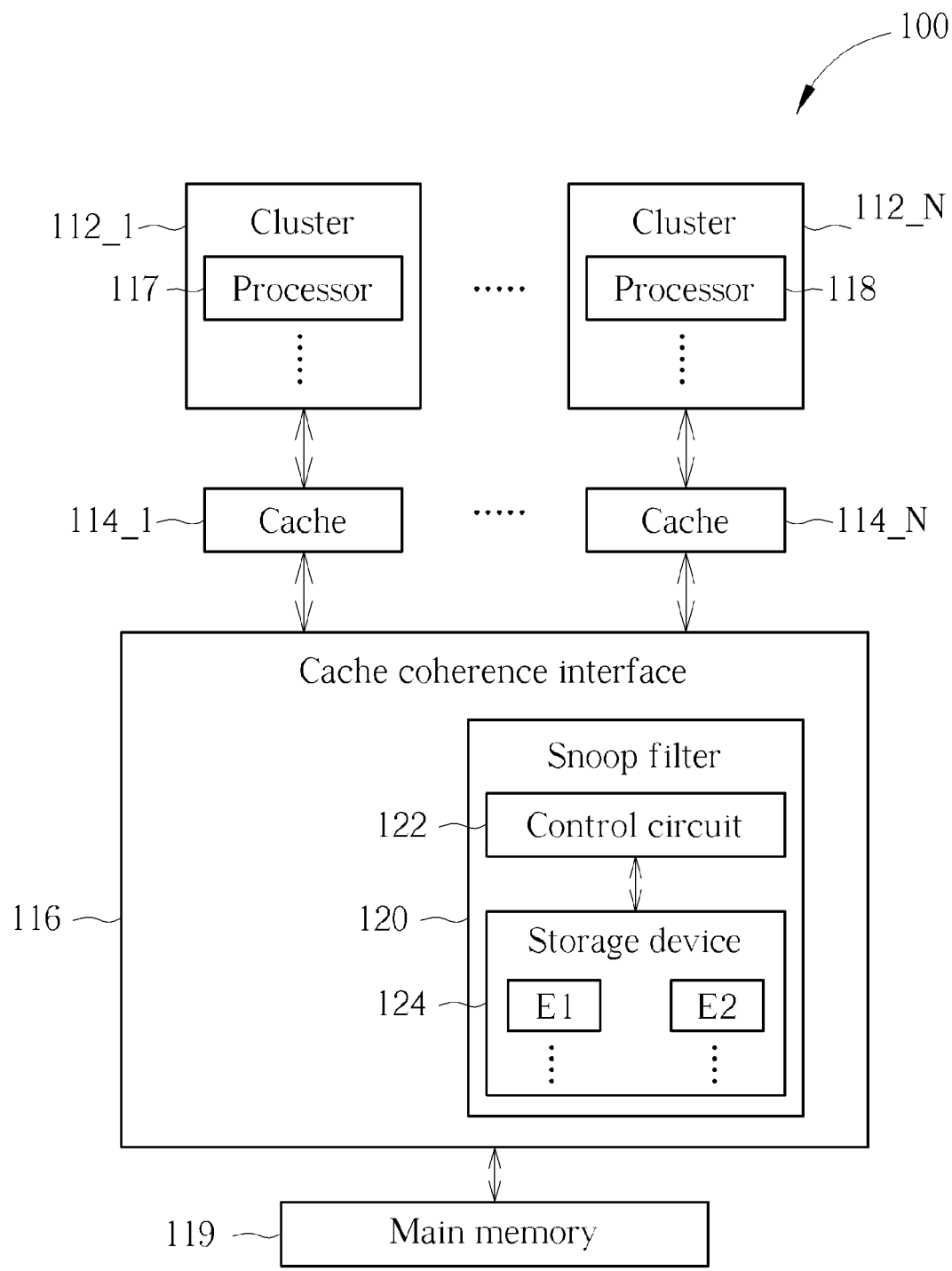
FIG. 1 is a diagram illustrating a multi-processor system according to an embodiment of the present invention.

FIG. 1 is a diagram illustrating a multi-processor system according to an embodiment of the present invention. The multi-processor system 100 may be implemented in a portable device, such as a mobile phone, a tablet, a wearable device, etc. However, this is not meant to be a limitation of the present invention. That is, any electronic device using the proposed snoop filter falls within the scope of the present invention. In this embodiment, the multi-processor system 100 may have a plurality of clusters 112_1-112_N, where N is a positive integer and may be adjusted according to actual design considerations. That is, the present invention has no limitation on the number of clusters implemented in the multi-processor system 100.

Regarding the clusters 112_1-112_N, each cluster may be a group of processors (or called processor cores). For example, the cluster 112_1 may include one or more processors 117, and the cluster 112_N may include one or more processors 118. It should be noted that, the processor numbers of the clusters 112_1-112_N may be adjusted, depending upon the actual design considerations. For example, the number of processor cores 117 included in the cluster 112_1 may be identical to or different from the number of processor cores 118 included in the cluster 112_N.

The clusters 112_1-112_N may have their dedicated caches. In this example, one dedicated cache (e.g., L2 cache) may be assigned to each cluster. As shown in FIG. 1, the multi-processor system 100 may have a plurality of caches 114_1-114_N. Hence, the cluster 112_1 may use one cache 114_1, and the cluster 112_N may use another cache 114_N. In addition, a cache coherence interconnect 116 may be used to manage coherency among the caches 114_1-114_N individually accessed by the clusters 112_1-112_N. As shown in FIG. 1, there is a main memory 119 shared by the processors 117 and 118 in the clusters 112_1-112_N, where the main memory 119 is coupled to the caches 114_1-114_N via the cache coherence interconnect 116. A cache line in a specific cache assigned to one specific cluster may be accessed based on a requested memory address included in a read/write request issued from a processor of the specific cluster. In a case where a cache miss of the specific cache occurs, the requested data may be retrieved from other caches or may be retrieved from the main memory 119. For example, if the requested data is available in another cache, the requested data is read from another cache and then stored into the specific cache. For another example, if the requested data is not available in other caches, the requested data is read from the main memory 119 and then stored into the specific cache. In another case where a cache hit of the specific cache occurs, the requested data may be retrieved from the specific cache. That is, when a cache hit of the specific cache occurs, this means that the requested data is available in the specific cache, such that there is no need to access the main memory 119 and other caches.

Snooping is the process where the individual caches detect if they have the requested data or not. However, as mentioned above, a large amount of snooping is unnecessary since other caches often do not have the requested cache line. In this embodiment, the cache coherence interface 116 is configured to include a snoop filter 120 for reducing the cache coherence traffic by filtering unnecessary snooping operations. The snoop filter 120 includes a control circuit 122 and a storage device 124. For example, the storage device 124 maybe implemented using an internal memory such as a statistic random access memory (SRAM). The control circuit 122 is arranged to manage one or more first-type entries (e.g., unique table entries) E1 and one or more second-type entries (e.g., shared table entries) E2 stored in the storage device 124. With regard to a first-type entry E1, it is configured to record information indicative of a first cache of the multi-processor system 100 and first requested memory addresses that are associated with multiple first cache lines each being only available in the first cache. With regard to a second-type entry E2, it is configured to record information indicative of multiple second caches of the multi-processor system 100 and at least a second requested memory address that is associated with a second cache line being available in each of the multiple second caches.

Many programs have spatial locality. Hence, data requested by a program is often stored in continuous memory addresses. In addition, most cache lines are unique. Hence, data requested by a program is often cached in a single cache only. Based on these observations, the present invention proposes the first-type entry (e.g., unique table entry) E1 with a first data structure and the second-type entry (e.g., shared table entry) E2 with a second data structure different from the first data structure. The first data structure is suitable for recording existence information of cache lines only reside in one cache. The second data structure is suitable for recording existence information of cache lines reside in more than one cache. With the use of the first-type entries E1 and/or the second-type entries E2, the snoop filter 120 may be a directory-based snoop filter with a more compact directory compared to the conventional directory-based snoop filter. Further details of the first-type entry E1 and the second-type entry E2 are described as below.

Figure 2:
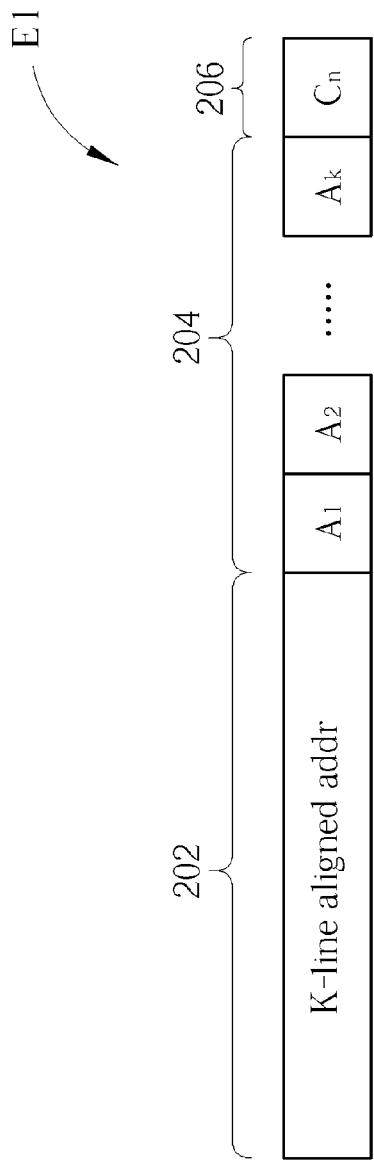
FIG. 2 is a diagram illustrating a first data structure of the first-type entry (e.g., unique table entry) according to an embodiment of the present invention.

FIG. 2 is a diagram illustrating the first data structure of the first-type entry (e.g., unique table entry) E1 according to an embodiment of the present invention. As shown in FIG. 2, the first-type entry E1 includes an address field 202, a vector field 204, and a cache index field 206. The address field 202 is arranged to store a common part of K memory addresses (denoted as "K-line aligned addr"), where K is a positive integer larger than one. For example, each of the K memory addresses may include a most significant bit (MSB) part, a central significant bit (CSB) part, and a least significant bit (LSB) part. In one exemplary design, the K memory addresses may be continuous memory addresses. For example, the MSB parts of the K memory addresses are the same, the CSB parts of the K memory addresses are the same, and the LSB parts of the K memory addresses are not the same. Hence, the address field 202 may be used to store the same MSB part and the same CSB part common to the continuous memory addresses. However, this is for illustrative purposes only, and is not meant to be a limitation of the present invention. In another exemplary design, K memory addresses may be discontinuous memory addresses that are equally spaced. For example, the MSB parts of the K memory addresses are the same, the CSB parts of the K memory addresses are not the same, and the LSB parts of the K memory addresses are the same. Hence, the address field 202 may be used to store the same MSB part and the same LSB part common to the discontinuous memory addresses. For another example, the MSB parts of the K memory addresses are not the same, the CSB parts of the K memory addresses are the same, and the LSB parts of the K memory addresses are the same. Hence, the address field 202 may be used to store the same CSB part and the same LSB part common to the discontinuous memory addresses.

The vector field 204 is arranged to store K indication bits $A_1$-$A_K$, where the K indication bits $A_1$-$A_K$ are arranged to indicate existence of K cache lines in the same cache, respectively. The cache index field 206 is arranged to store a value Cn indicative of the cache that owns the K cache lines. For example, when $A_i$=1 (where i is within a range {1, K}) and Cn=j (where j is within a range {1, N}), it means a cache line associated with the $i^{th}$ memory address among the K memory addresses is available in the $j^{th}$ cache among the N caches 114_1-114_N.

By way of example, but not limitation, K may be 4. Hence, each first-type entry E1 stored in the storage device 124 is capable of recording information indicative of up to 4 cache lines unique to a single cache. However, this is not meant to be a limitation of the present invention. In practice, the value of K may be adjusted, depending upon actual design considerations.

Figure 3:
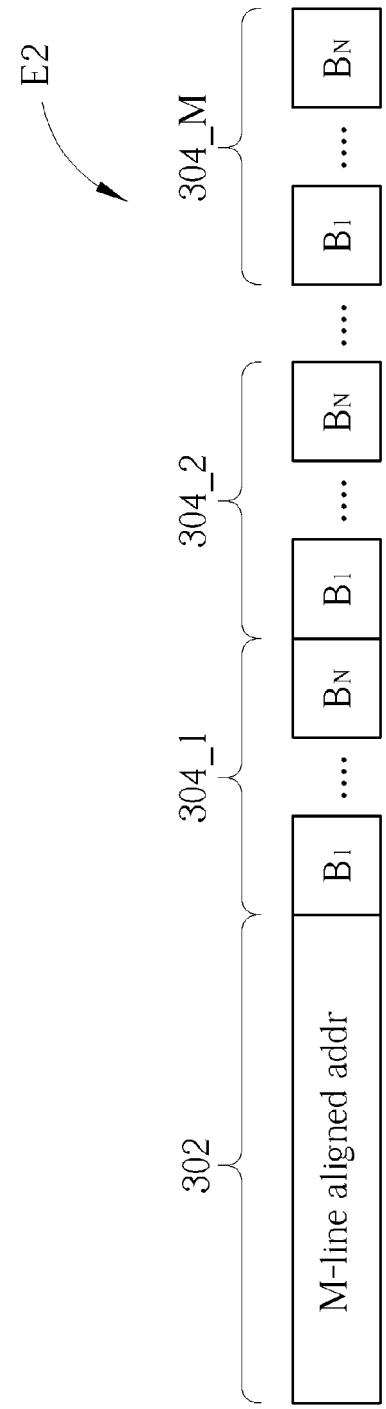
FIG. 3 is a diagram illustrating a second data structure of the second-type entry (e.g., shared table entry) according to an embodiment of the present invention.

FIG. 3 is a diagram illustrating the second data structure of the second-type entry (e.g., shared table entry) E2 according to an embodiment of the present invention. As shown in FIG. 3, the second-type entry E2 includes an address field 302 and a plurality of vector fields 304_1-304_M, where M is a positive integer that may be equal to or larger than one. The address field 302 is arranged to store a common part of M memory addresses (denoted as "M-line aligned addr"). For example, each of the M memory addresses may include a most significant bit (MSB) part, a central significant bit (CSB) part, and a least significant bit (LSB) part. In one exemplary design, the M memory addresses may be continuous memory addresses. For example, the MSB parts of the M memory addresses are the same, the CSB parts of the M memory addresses are the same, and the LSB parts of the M memory addresses are not the same. Hence, the address field 302 may be used to store the same MSB part and the same CSB part common to the continuous memory addresses. However, this is for illustrative purposes only, and is not meant to be a limitation of the present invention. In another exemplary design, M memory addresses may be discontinuous memory addresses that are equally spaced. For example, the MSB parts of the M memory addresses are the same, the CSB parts of the M memory addresses are not the same, and the LSB parts of the M memory addresses are the same. Hence, the address field 302 may be used to store the same MSB part and the same LSB part common to the discontinuous memory addresses. For another example, the MSB parts of the M memory addresses are not the same, the CSB parts of the M memory addresses are the same, and the LSB parts of the M memory addresses are the same. Hence, the address field 302 may be used to store the same CSB part and the same LSB part common to the discontinuous memory addresses.

The M vector fields 304_1-304_M correspond to the M memory addresses, respectively. Each of the M vector fields 304_1-304_M includes N indication bits $B_1$-$B_N$ arranged to indicate existence of the same cache line in the N caches 114_1-114_N, respectively. For example, when $B_i$=1 (where i is within a range {1, N}) of the vector field 304_j (where j is within a range {1, M}), it means a cache line associated with the $j^{th}$ memory address among the M memory addresses is available in the $i^{th}$ cache among the N caches 114_1-114_N.

By way of example, but not limitation, M may be 2. Hence, each second-type entry E2 stored in the storage device 124 is capable of recording information indicative of up to 2 cache lines each shared by multiple caches. However, this is not meant to be a limitation of the present invention. In practice, the value of M may be adjusted, depending upon actual design considerations. For example, the value of K may be equal to or different from the value of M. It should be noted that an existence status of each cache line, either a unique cache line or a shared cache line, only exists in one of the unique table and the shared table.

Figure 4:
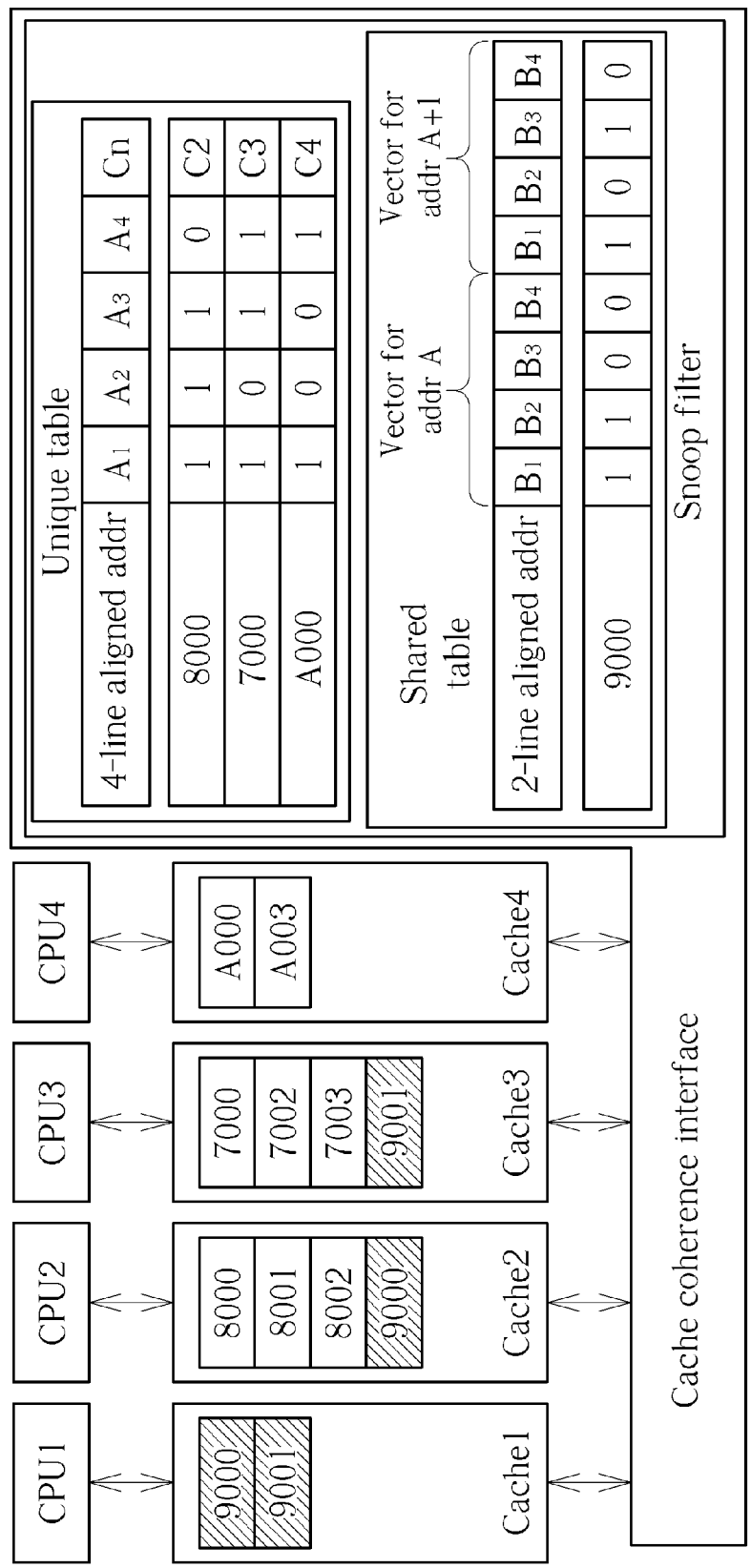
FIG. 4 is a diagram illustrating an example of first-type entries and second-type entries managed by the proposed snoop filter.

For better understanding of technical features of the proposed first-type entry (e.g., unique table entry) E1 and second-type entry (e.g., shared table entry) E2, an example is illustrated in FIG. 4. It is assumed that N=4, K=4, and M=2. Hence, the multi-processor system may be configured to include 4 caches Cache1-Cache4 assigned to 4 processors CPU1-CPU4, respectively. As shown in FIG. 4, the first processor CPU1 has issued read/write requests including requested memory addresses 9000 and 9001; the second processor CPU2 has issued read/write requests including requested memory addresses 8000, 8001, 8002, and 9000; the third processor CPU3 has issued read/write requests including requested memory addresses 7000, 7002, 7003, and 9001; and the fourth processor CPU4 has issued read/write requests including requested memory addresses A000 and A003. At this moment, the snoop filter (e.g., snoop filter 120) has a unique table and a shared table, where the unique table has three first-type entries, and the shared table has one second-type entry.

As can be seen from FIG. 4, the requested memory addresses 8000, 8001 (i.e., 8000+1), and 8002 (i.e., 8000+2) are associated with cache lines each being only available in the second cache Cache2. Hence, one first-type entry has an address field set by a common address value "8000", a vector field set by a bit string "1110", and a cache index field set by "C2" for the second cache Cache2. The requested memory addresses 7000, 7002 (i.e., 7000+2), and 7003 (i.e., 7000+3) are associated with cache lines each being only available in the third cache Cache3. Hence, another first-type entry has an address field set by a common address value "7000", a vector field set by a bit string "1011", and a cache index field set by "C3" for the third cache Cache3. Further, the requested memory addresses A000 and A003 (i.e., A000+3) are associated with cache lines each being only available in the fourth cache Cache4. Hence, the other first-type entry has an address field set by a common address value "A000", a vector field set by a bit string "1001", and a cache index field set by "C4" for the fourth cache Cache4.

As can be seen from FIG. 4, the requested memory address 9000 is associated with the same cache line available in both of the first cache Cache1 and the second cache Cache2, and the requested memory address 9001 (i.e., 9000+1) is associated with the same cache line available in both of the first cache Cache1 and the third cache Cache3. Hence, the second-type entry has an address field set by a common address value "9000", a first vector field set by a bit string "1100" for one shared cache line associated with the requested memory address 9000, and a second vector field set by a bit string "1010" for the other shared cache line associated with the requested memory address 9001.

As mentioned above, the first data structure used by the first-type entry E1 is different from the second data structure used by the second-type entry E2. In one exemplary design, the size of the unique table and the size of the shared table may be fixed at the design phase. If an application contains a large number of shared cache lines, the shared table may be full and the unique table may be empty in a worst case. If an application contains a large number of unique cache lines, the unique table may be full and the shared table may be empty in a worst case. Therefore, a selected configuration of the fixed-sized unique table and the fixed-sized shared table may only fit certain applications. As a result, such a snoop filter design using a fixed unique table and a fixed shared table size is less flexible. Hence, the present invention further proposes a snoop filter design using a unified memory with configurable entries.

If the maximum number of unique cache lines recorded in the first-type entry E1 is equal to the maximum number of shared cache lines recorded in the second-type entry E2 (i.e., K=M), the bit length of the address field in the first-type entry E1 is equal to the bit length of the address field in the second-type entry E2. If the maximum number of unique cache lines recorded in the first-type entry E1 is slightly different from the maximum number of shared cache lines recorded in the second-type entry E2 (i.e., K≠M), the bit length of the address field in the first-type entry E1 is slightly different from the bit length of the address field in the second-type entry E2. For example, assuming that the cache line size is 64 bytes and a 32-bit address space is employed, a 4-line aligned address recorded in the first-type entry E1 needs 24 bits, while a 2-line aligned address recorded in the second-type entry E2 needs 25 bits. Based on the above observations, the present invention therefore proposes implementing the storage device 124 by a unified memory for both the unique table and the shared table, thereby increasing the flexibility of the snoop filter 120.

Figure 5:
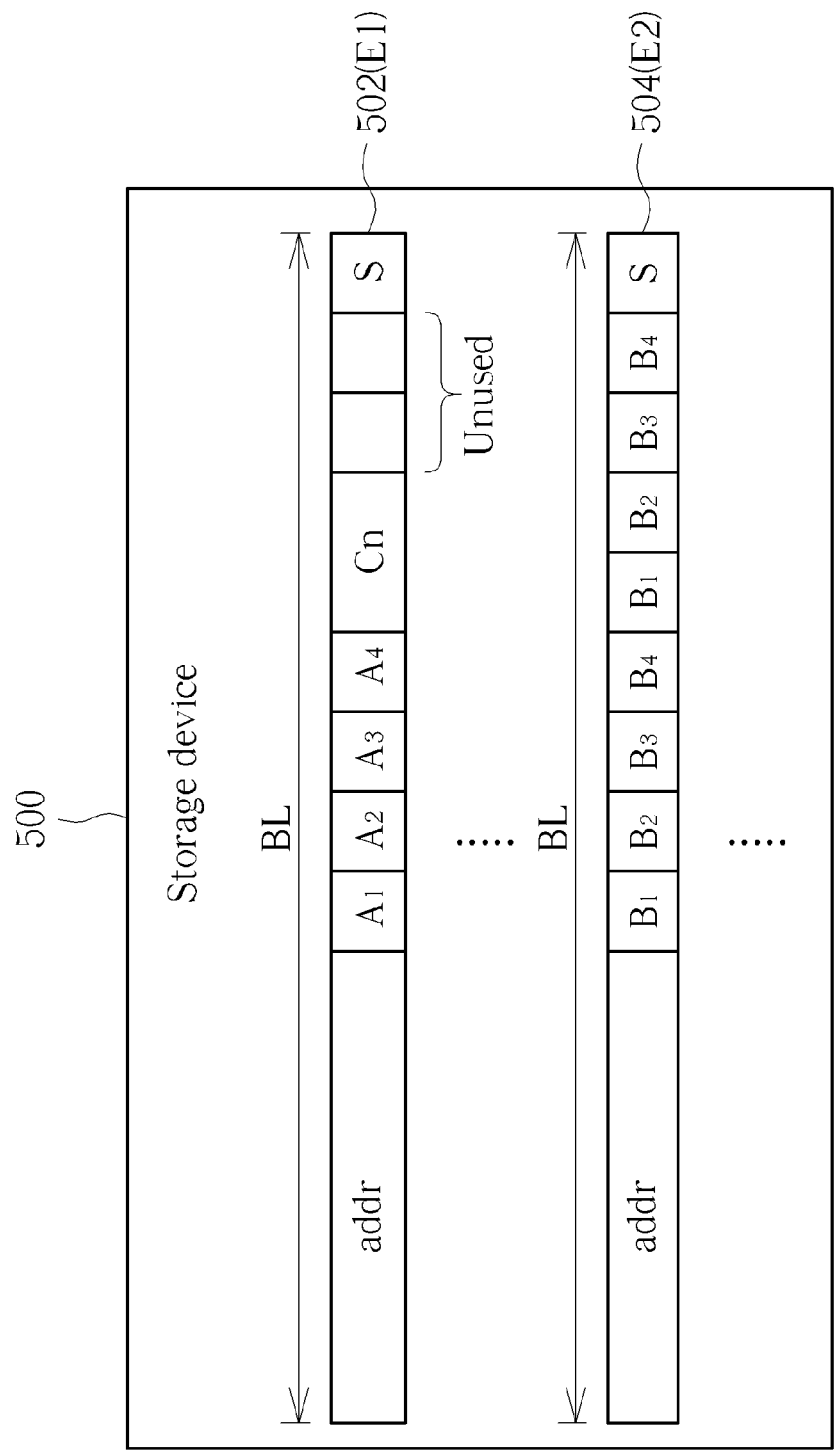
FIG. 5 is a diagram illustrating a storage device with configurable entries according to an embodiment of the present invention.

FIG. 5 is a diagram illustrating a storage device with configurable entries according to an embodiment of the present invention. In one exemplary design, the storage device 124 shown in FIG. 1 may be implemented using the storage device 500 shown in FIG. 5. A plurality of configurable entries, each having the same bit length BL, may be allocated in the same storage device 500. When the multi-processor system 100 is powered on to start working normally, each of the configurable entries maybe adaptively configured to act as a first-type entry (unique table entry) E1 or a second-type entry (shared table entry) E2. Hence, the size of the unique table and the size of the shared table can be dynamically adjusted during the normal operation of the multi-processor system 100, thereby fitting a wider range of applications.

As shown in FIG. 5, one configurable entry 502 maybe configured to serve as a first-type entry E1, and one configurable entry 504 may be configured to serve as a second-type entry E1. In addition to the address field, the vector field and the cache index field mentioned above, an additional bit S is included in the first data structure of the first-type entry E1 to indicate the type of the configurable entry 502. Similarly, in addition to the address field and the vector fields mentioned above, an additional bit S is included in the second data structure of the second-type entry E2 to indicate the type of the configurable entry 504. For example, an additional bit S in the end of a configurable entry is set by "0" when the configurable entry is configured to serve as a unique table entry, and the additional bit S in the end of the configurable entry is set by "1" when the configurable entry is configured to serve as a shared table entry. However, this is for illustrative purposes only, and is not meant to be a limitation of the present invention.

Since each of the configurable entries has the same bit length and the first data structure used by the first-type entry E1 is different from the second data structure used by the second-type entry E2, there may be one or more unused bits in a configurable entry configured to act as the first-type entry E1 (if K>M) or configured to act as the second-type entry E2 (if K<M). For example, as shown in FIG. 5, the configurable entry 502 configured to act as the first-type entry E1 may have 3 bits unused. However, this is for illustrative purposes only, and is not meant to be a limitation of the present invention. For example, the actual bit positions of these unused bits may be adjusted, depending upon actual design considerations.

Figure 15:
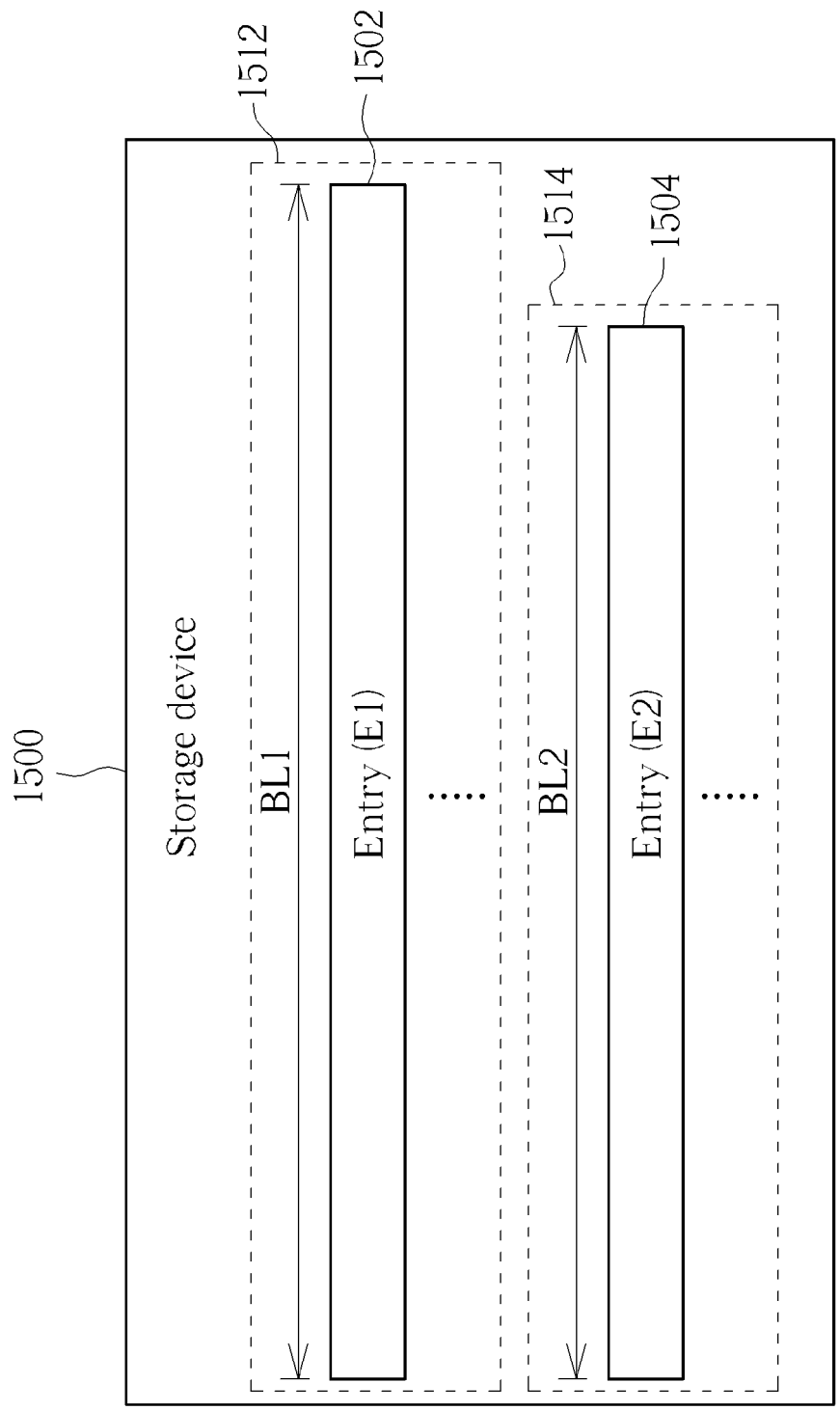
FIG. 15 is a diagram illustrating a storage device with at least two sub-storage devices according to an embodiment of the present invention.

In the example shown in FIG. 5, a unique table and a shared table may be stored in the same storage device with table entries in the same bit length. However, this is for illustrative purposes only, and is not meant to be a limitation of the present invention. FIG. 15 is a diagram illustrating a storage device with at least two sub-storage devices according to an embodiment of the present invention. In another exemplary design, the storage device 124 shown in FIG. 1 may be implemented using the storage device 1500 shown in FIG. 15. The storage device 1500 may include at least two sub-storage devices 1512 and 1514, where the sub-storage device 1512 is arranged to have entries 1502 in a first bit length BL1, and the sub-storage device 1514 is arranged to have entries 1504 in a second bit length BL2. The second bit length BL2 may be different from or equal to the first bit length BL1, depending upon the actual design consideration. In the example shown in FIG. 15, the first bit length BL1 is shown larger than the second bit length BL2. Alternatively, the first bit length BL1 maybe smaller than or equal to the second bit length BL2. Each entry 1502 in the sub-storage device 1512 may be a first-type entry (unique table entry) E1. Each entry 1504 in the sub-storage device 1514 may be a second-type entry (shared table entry) E2. In other words, a unique table is created and stored in the sub-storage device 1512 only, and a shared table is created and stored in the sub-storage device 1514 only. To put it simply, the unique table and the shared table may be separately stored in different sub-storage devices with table entries in the same bit length or different bit lengths. This also falls within the scope of the present invention.

The control circuit 122 of the snoop filter 120 is used to manage a plurality of entries, including one or more first-type entries E1 and/or one or more second-type entries E2, stored in the storage device 124 of the snoop filter 120, where the entries are arranged to record statuses of cache lines available in caches 114_1-114_N of the multi-processor system 100. In one exemplary design, a first entry (e.g., first-type entry E1) may be stored in the storage device 124 according to a first entry placement with first associativity, and a second entry (e.g., second-type entry) may be stored in the same storage device 124 according to a second entry placement with second associativity. The first entry placement and the second entry placement may have same or different associativity. That is, the first associativity may be identical to or different from the second associativity, depending upon actual design considerations. For example, the first-type entry E1 may be stored in the storage device 124 according to one of direct-mapped entry placement, set-associative entry placement and fully-associative entry placement. For another example, the second-type entry E2 maybe stored in the storage device 124 according to one of direct-mapped entry placement, set-associative entry placement and fully-associative entry placement. More specifically, the same cache associativity concept may be employed by the control circuit 122 for storing and accessing first-type entries E1 and second-type entries E2 in the storage device 124. As a person skilled in the cache associativity design should readily understand these associativity types "direct-mapped (associativity=1)", "set-associative (associativity=n)" and "fully-associative (associativity=# of table entries)", further explanation is omitted here for brevity.

Figure 6:
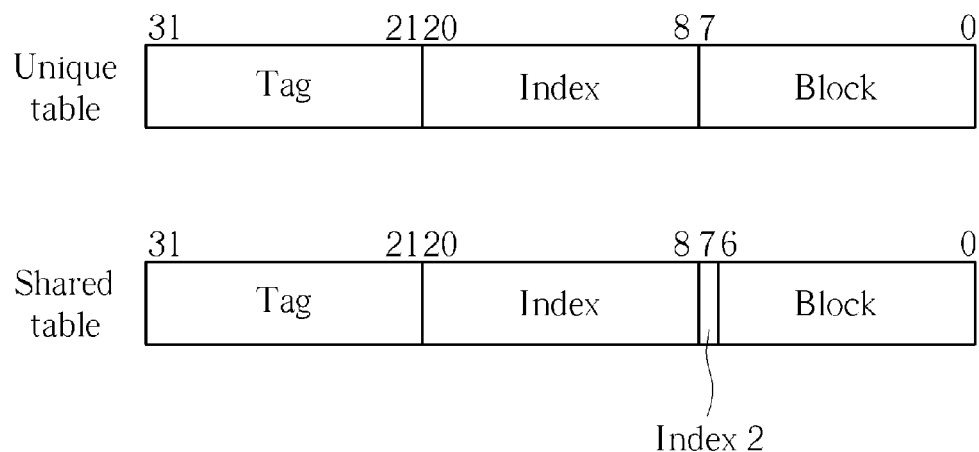
FIG. 6 is a diagram illustrating address partitions of requested memory addresses associated with the unique table entry and the shared table entry according to an embodiment of the present invention.

FIG. 6 is a diagram illustrating address partitions of requested memory addresses associated with the unique table entry and the shared table entry according to an embodiment of the present invention. Assume that K=4, M=2, the cache line size is 64 bytes and a 32-bit address space is employed. In a case where a fully-associated entry placement is employed for both of the unique table and the shared table, bits 8-31 of a 32-bit requested memory address are used as a tag and stored in an address field of a first-type entry (unique table entry), and bits 0-7 act as a block offset for four 64-byte cache lines; and bits 7-31 of a 32-bit requested memory address are used as a tag and stored in an address field of a second-type entry (shared table entry), and bits 0-6 act as a block offset for two 64-byte cache lines. Consider another case where a set-associative entry placement is employed for both of the unique table and the shared table. As shown in FIG. 6, bits 21-31 of a 32-bit requested memory address are used as a tag and stored in an address field of a first-type entry (unique table entry), bits 8-20 of the same 32-bit requested memory address are used as an index value, and bits 0-7 act as a block offset for four 64-byte cache lines; and bits 21-31 of a 32-bit requested memory address are used as a tag and stored in an address field of a second-type entry (shared table entry), bits 8-20 of the same 32-bit requested memory address are used as one index value, bit 7 of the same 32-bit requested memory address is used as the other index value (denoted as index2), and bits 0-6 act as a block offset for two 64-byte cache lines. The index value (s) can be used to locate a set of table entries in the storage device 124, and the tag can be used to check if a table entry in the set is hit.

Figure 7:
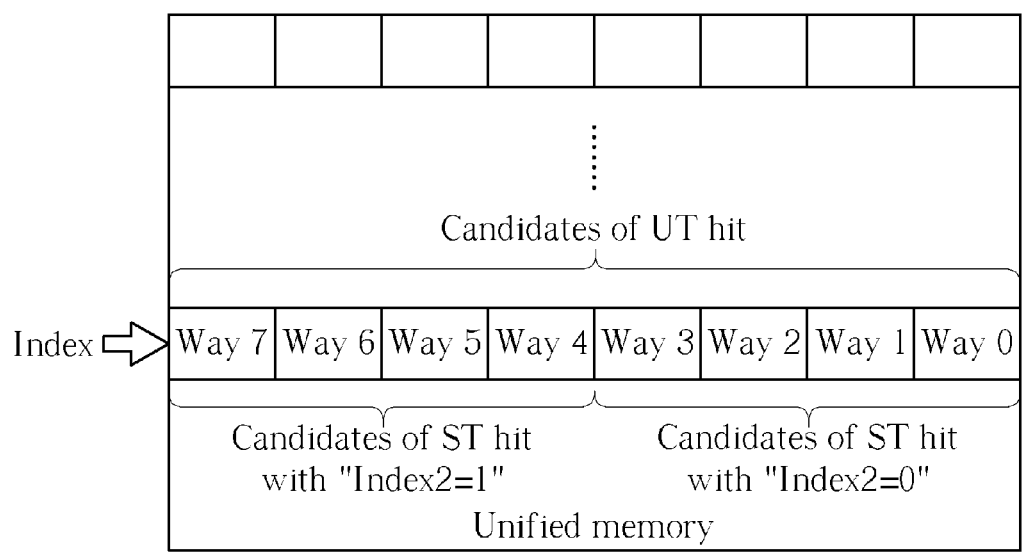
FIG. 7 is a diagram illustrating an 8-way set-associative entry placement for the unique table entries and a 4-way set-associative entry placement for the shared table entries according to an embodiment of the present invention.

FIG. 7 is a diagram illustrating an 8-way set-associative entry placement for the unique table (UT) entries and a 4-way set-associative entry placement for the shared table (ST) entries according to an embodiment of the present invention. Hence, 8 unique table entries (e.g., Way 0-Way 7) may belong to the same set indexed by the index value Bit [20:8] , and the tag value Bit [31:21] is compared with address values stored in address fields of the unique table entries (e.g., Way 0-Way 7) to find if one of the unique table entries (e.g., Way 0-Way 7) is hit. In addition, 4 shared table entries (e.g., Way 0-Way 3 or Way 4-Way 7) may belong to the same set indexed by the index values Bit [20:8] and Bit [7] , and the tag value Bit [31:21] is compared with address values stored in address fields of the shared table entries (e.g., Way 0-Way 3 or Way 4-Way 7) to find if one of the shared table entries (e.g., Way 0-Way 3 or Way 4-Way 7) is hit.

Figure 8:
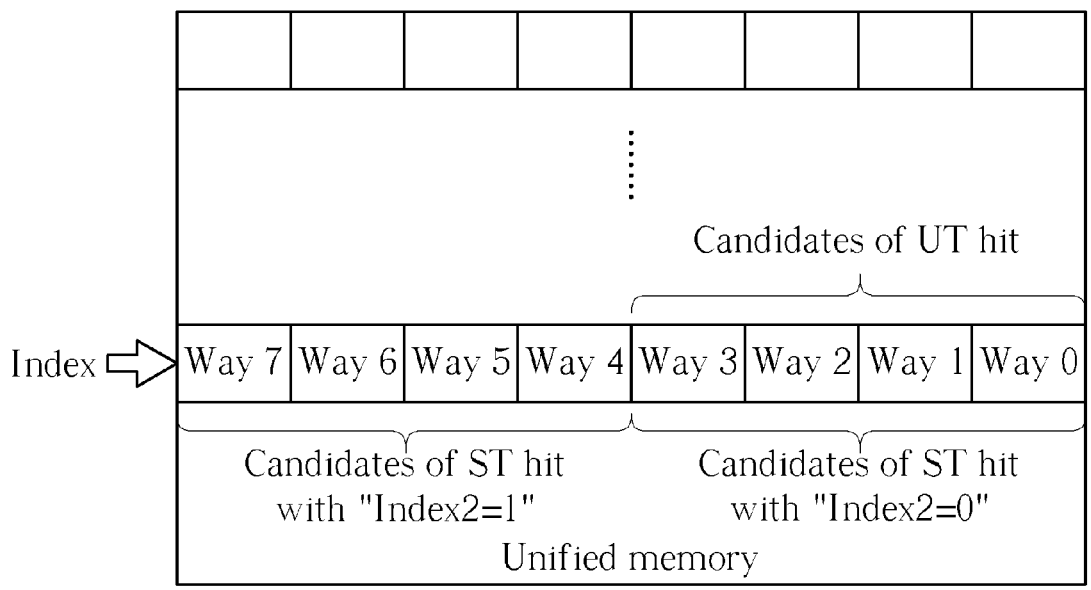
FIG. 8 shows a 4-way set-associative entry placement for the unique table entries and a 4-way set-associative entry placement for the shared table entries according to an embodiment of the present invention.

It should be noted that, in the same storage device 124, the unique table and the shared table may use the same associativity or different associativity, depending upon the actual design consideration. For example, in a case where K=M, FIG. 8 shows a 4-way set-associative entry placement for the unique table entries and a 4-way set-associative entry placement for the shared table entries according to an embodiment of the present invention.

Figure 9:
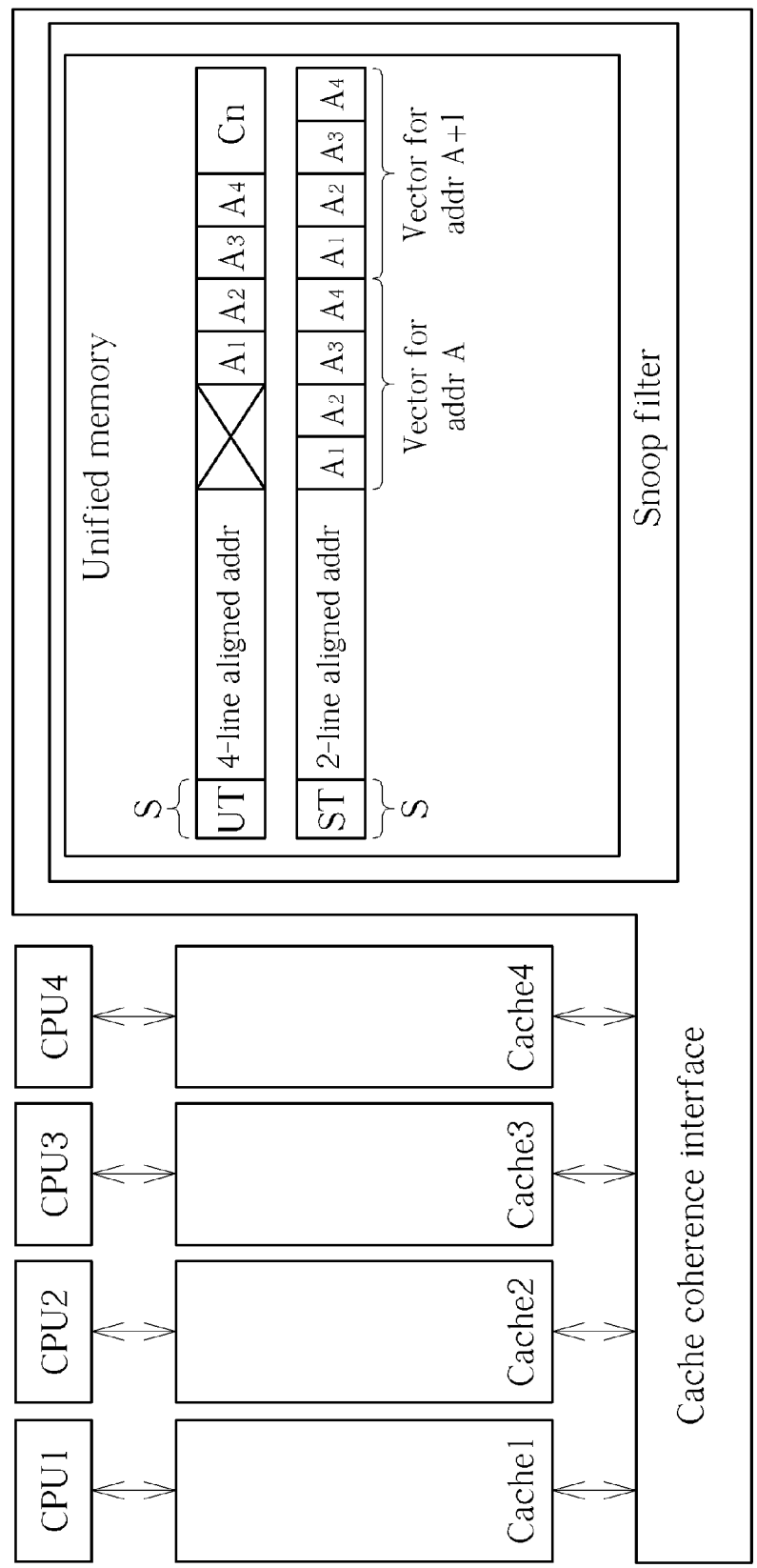
FIGS. 9-13 are diagrams illustrating an example of creating and updating first-type entries and second-type entries.

The first-type entries E1 and the second-type entries E2 may be dynamically created and updated during the normal operation of the multi-processor system 100. Please refer to FIGS. 9-13, which illustrate an example of creating and updating first-type entries E1 and second-type entries E2. It is assumed that N=4, K=4, and M=2. Hence, the multi-processor system may include 4 caches Cache1-Cache4 assigned to 4 processors CPU1-CPU4, respectively. In addition, the proposed unified memory is adopted. Hence, the unified memory may be used to store a plurality of configurable entries, each having the same bit length. Initially, no read/write requests are issued from any of the processors CPU1-CPU4. Hence, in the initial state shown in FIG. 9, the caches Cache1-Cache4 has no cache line stored therein, and the unified memory has no first-type entries E1 and second-type entries E2 stored therein. For clarity, the first data structure of the first-type entry E1 set by configuring one configurable entry in the unified memory and the second data structure of the second-type entry E2 set by configuring one configurable entry in the unified memory are illustrated in FIG. 9.

Figure 10:
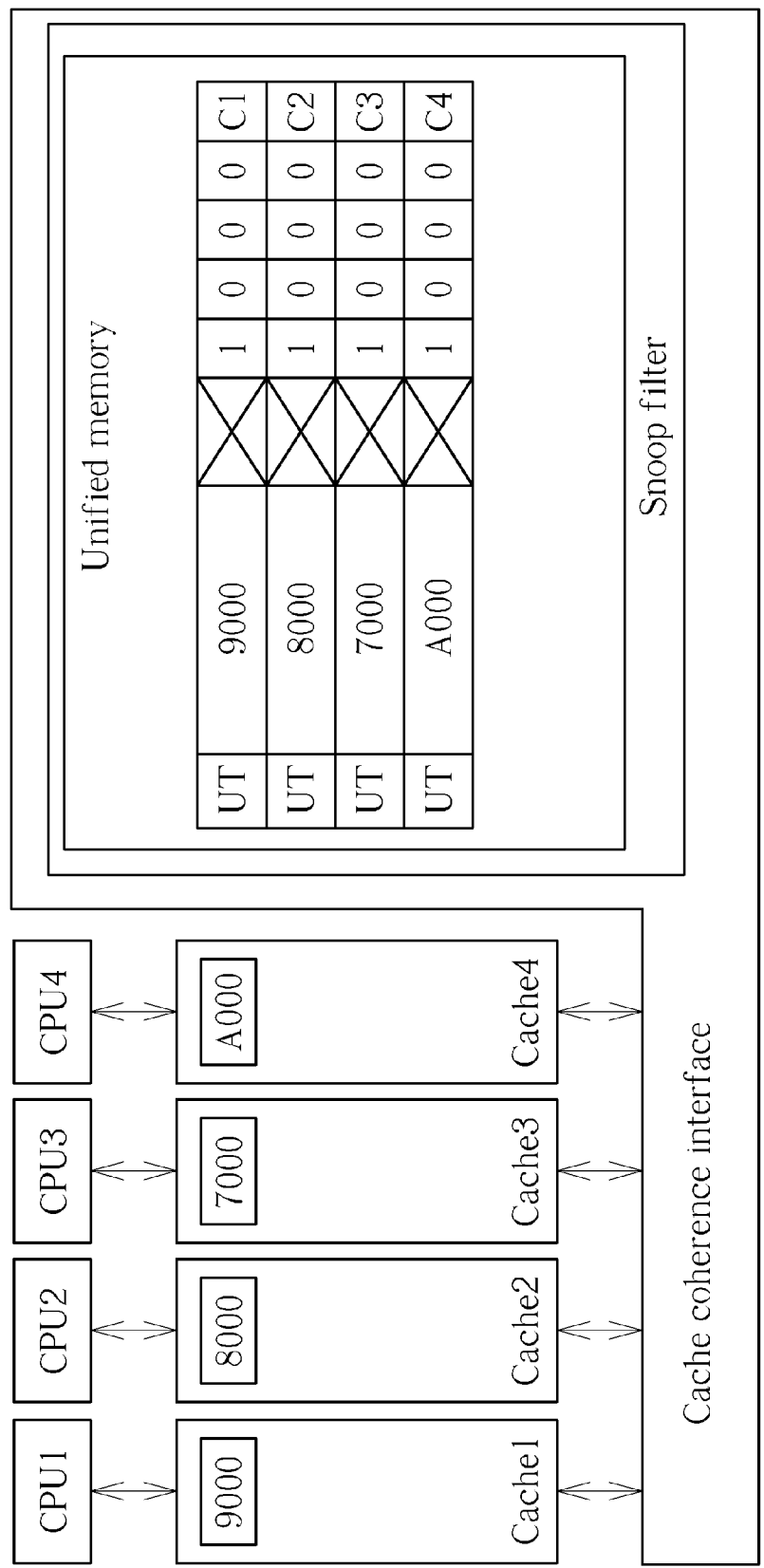

As shown in FIG. 10, the first processor CPU1 issues a read/write request including a requested memory address 9000; the second processor CPU2 issues a read/write request including a requested memory address 8000; the third processor CPU3 issues a read/write request including a requested memory address 7000; and the fourth processor CPU4 issues a read/write request including a requested memory address A000. The requested memory address 9000 is associated with a cache line being only available in the first cache Cache1, the requested memory address 8000 is associated with a cache line being only available in the second cache Cache2, the requested memory address 7000 is associated with a cache line being only available in the third cache Cache3, and the requested memory address A000 is associated with a cache line being only available in the fourth cache Cache4. Hence, a first configurable entry (which is a new configurable entry found in the unified memory) is configured to act as a first-type entry having an address field set by a common address value "9000", a vector field set by a bit string "1000", and a cache index field set by "C1"for the first cache Cache1; a second configurable entry (which is a new configurable entry found in the unified memory) is configured to act as a first-type entry having an address field set by a common address value "8000", a vector field set by a bit string "1000", and a cache index field set by "C2" for the second cache Cache2; a third configurable entry (which is a new configurable entry found in the unified memory) is configured to act as a first-type entry having an address field set by a common address value "7000", a vector field set by a bit string "1000", and a cache index field set by "C3" for the third cache Cache3; and a fourth configurable entry (which is a new configurable entry found in the unified memory) is configured to act as a first-type entry having an address field set by a common address value "A000", a vector field set by a bit string "1000", and a cache index field set by "C4" for the fourth cache Cache4.

Figure 11:
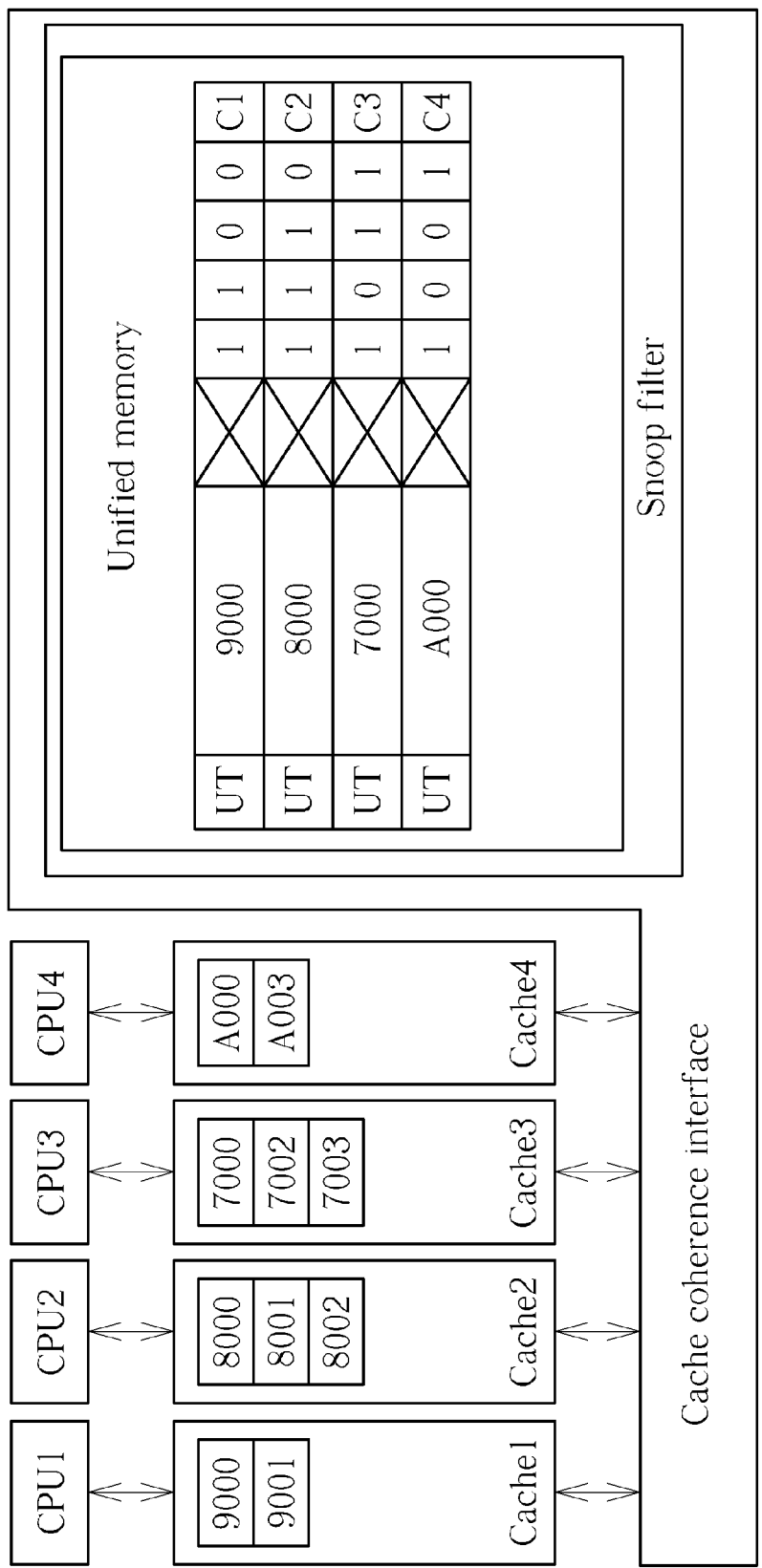

As shown in FIG. 11, the first processor CPU1 further issues one read/write request including a requested memory address 9001 (i.e., 9000+1); the second processor CPU2 further issues two read/write requests including requested memory addresses 8001 (i.e., 8000+1) and 8002 (i.e., 8000+2); the third processor CPU3 further issues two read/write requests including requested memory addresses 7002 (i.e., 7000+2) and 7003 (i.e., 7000+3); and the fourth processor CPU4 further issues one read/write request including a requested memory address A003 (i.e., A000+3). The requested memory addresses 9000 and 9001 are associated with cache lines each being only available in the first cache Cache1, the requested memory addresses 8000, 8001, and 8002 are associated with cache lines each being only available in the second cache Cache2, the requested memory addresses 7000, 7002, and 7003 are associated with cache lines each being only available in the third cache Cache3, and the requested memory addresses A000 and A003 are associated with cache lines each being only available in the fourth cache Cache4. Hence, a vector field set in the first configurable entry (which is already configured to act as a first-type entry for the first cache cache1) is updated to store a bit string "1100", a vector field set in the second configurable entry (which is already configured to act as a first-type entry for the second cache cache2) is updated to store a bit string "1110", a vector field set in the third configurable entry (which is already configured to act as a first-type entry for the third cache cache3) is updated to store a bit string "1011", and a vector field set in the fourth configurable entry (which is already configured to act as a first-type entry for the fourth cache cache4) is updated to store a bit string "1001".

Figure 12:
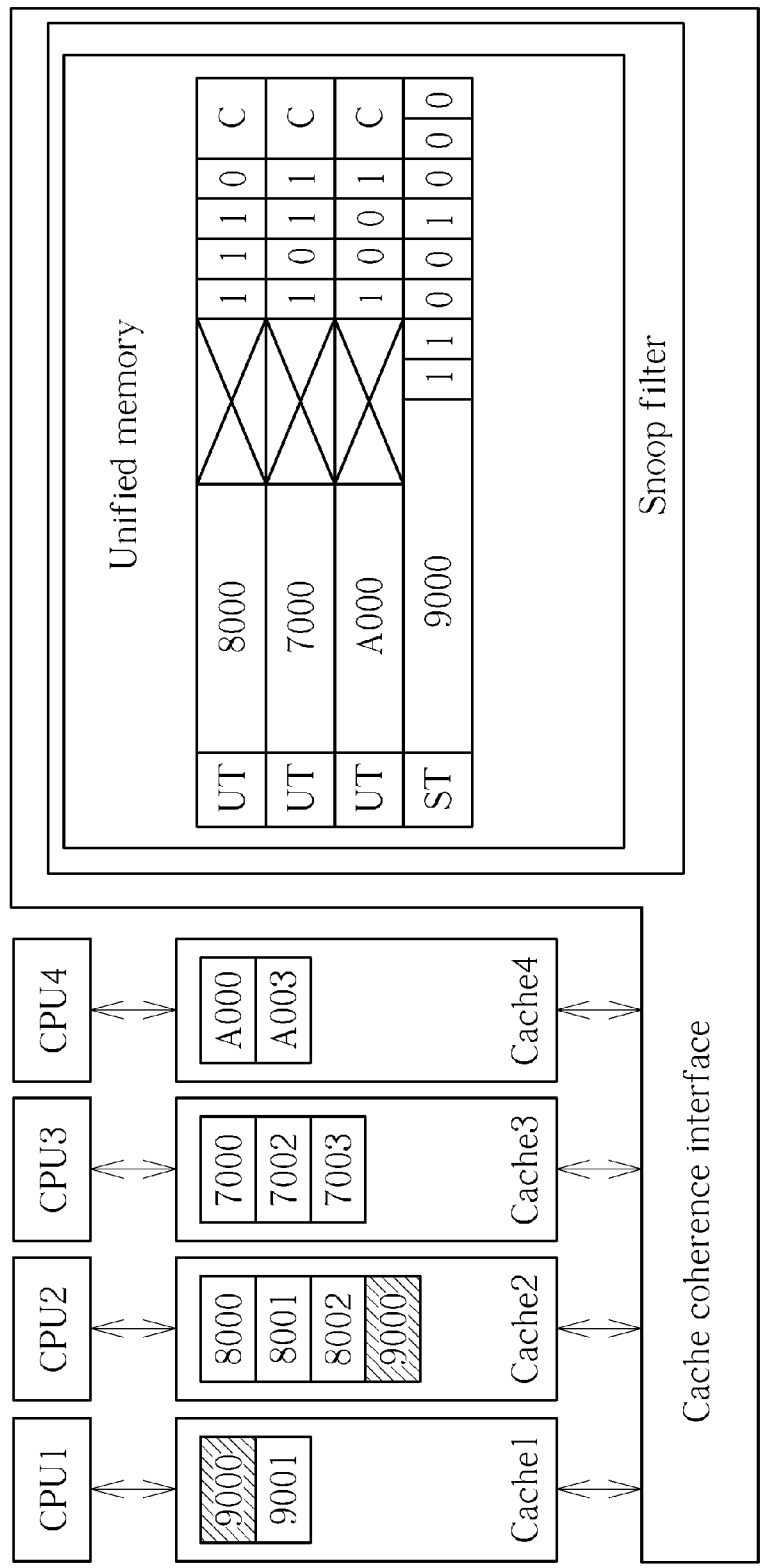

As shown in FIG. 12, the second processor CPU2 further issues one read/write request including a requested memory address 9000. The requested memory address 9000 is associated with the same cache line available in both of the first cache Cache1 and the second cache Cache2. In this example, the control circuit in the snoop filter may transfer the first configurable entry (which is already configured to act as a first-type entry for the first cache cache1) to another configurable entry (which is a new configurable found in the unified memory and then configured to act as a second-type entry for two cache lines). As shown in FIG. 12, the first configurable entry is removed, and a fifth configurable entry is selected and configured to act as a second-type entry having an address field set by a common address value "9000", a first vector field set by a bit string "1100" for one cache line associated with the requested memory address 9000, and a second vector field set by a bit string "1000" for the other cache line associated with the requested memory address 9001.

Figure 13:
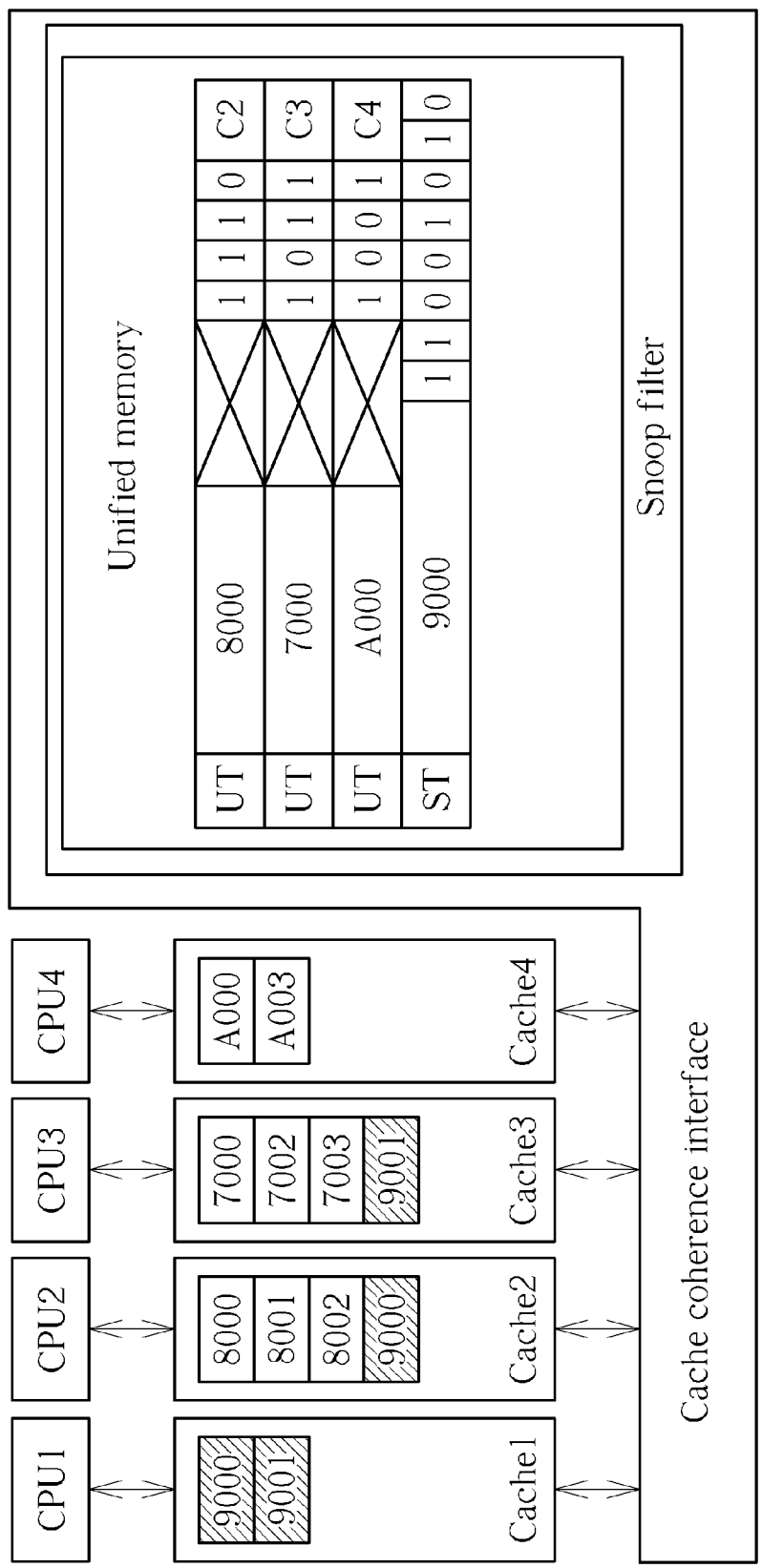

As shown in FIG. 13, the third processor CPU3 further issues one read/write request including a requested memory address 9001. The requested memory address 9001 is associated with the same cache line available in both of the first cache Cache1 and the third cache Cache3. In this example, the second vector field of the fifth configurable entry (which is already configured to act as a second-type entry for two requested memory addresses) is updated to store a bit string "1010".

Figure 14:
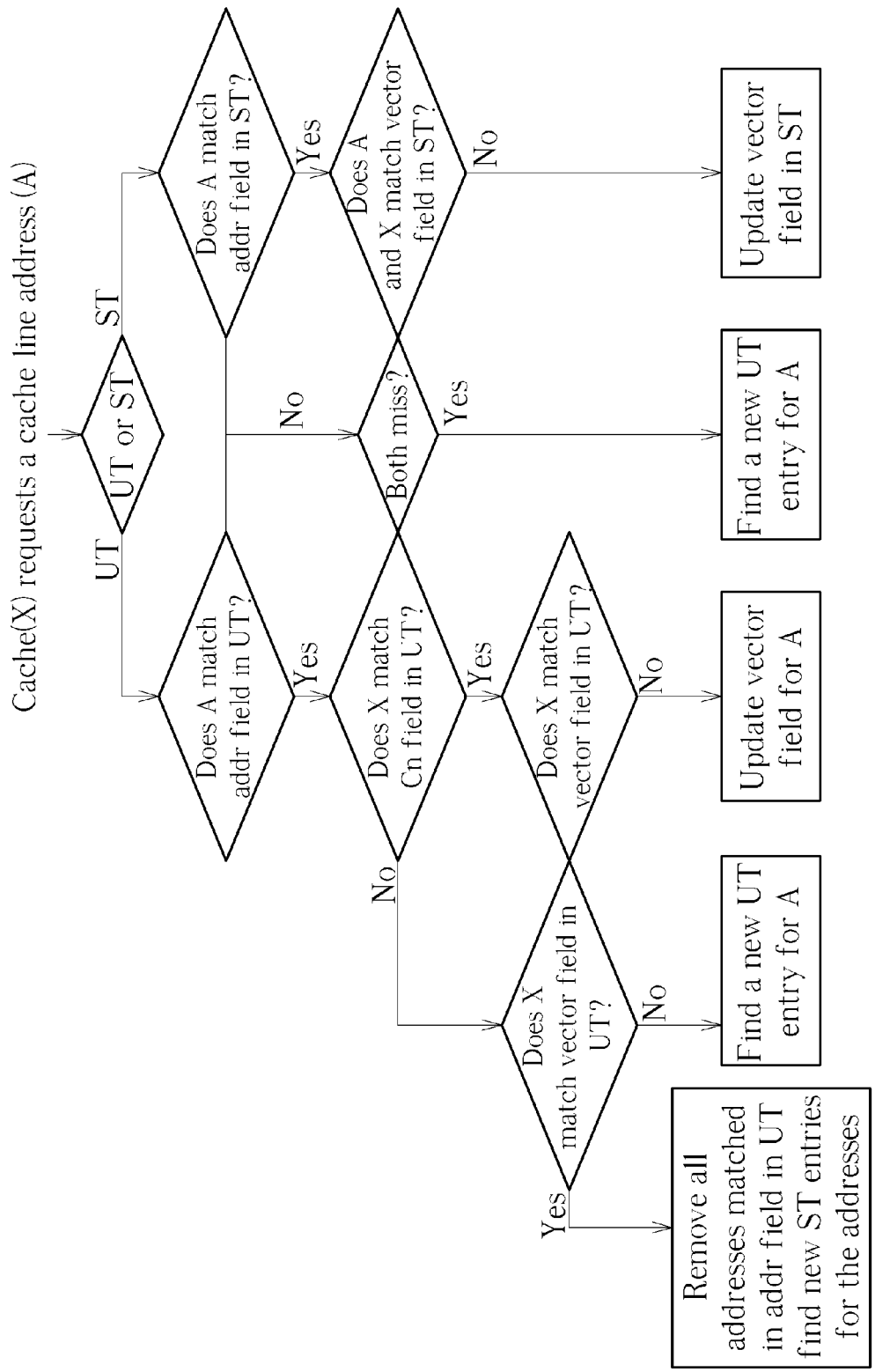
FIG. 14 is a flowchart illustrating a method for dynamically creating and updating first-type entries and second-type entries during the normal operation of the multi-processor system according to an embodiment of the present invention.

The operation of dynamically creating and updating first-type entries E1 and second-type entries E2 in the storage device 124 of the snoop filter 120 is controlled by the control circuit 122 of the snoop filter 120. For example, the control flow shown in FIG. 14 may be used to dynamically create and update first-type entries E1 and second-type entries E2 during the normal operation of the multi-processor system 100. With regard to a requested memory address (A) issued from a processor with a cache (X) assigned thereto, the address filed (aligned addr), the vector field ($A_1$-$A_k$) and the cache index field (Cn) in one or more unique table entries may be checked, and/or the address filed (aligned addr) and the vector fields ($B_1$-Bn) in one or more shared table entries maybe checked. Hence, the control circuit may refer to a checking result for finding and using a new unique table entry, updating an existing unique table entry, finding and using a new shared table entry, or updating an existing shared table entry. It should be noted that the steps shown in FIG. 14 are for illustrative purposes only, and are not meant to be limitations of the present invention. In practice, using a different control flow for dynamically creating and updating first-type entries E1 and second-type entries E2 during the normal operation of the multi-processor system 100 is feasible.

When a first transition condition is met, a first table transition operation may be performed by the control circuit 122 in the snoop filter 120 to transfer at least a portion (i.e., part or all) of an existing first-type entry to at least one new second-type entry in the storage device 122. For example, if a first-type entry is created to record information indicative of a plurality of cache lines for the same cache and one or more specific cache lines included in the cache lines become shared cache lines available in multiple caches later, the control circuit 122 may transfer the existence information of the specific cache line(s) from the first-type entry to at least one new second-type entry without removing the first-type entry and may update the vector field of the first-type entry correspondingly. For another example, if a first-type entry is created to record information indicative of a plurality of cache lines for the same cache and one or more specific cache lines included in the cache lines become shared cache lines available in multiple caches later, the control circuit 122 may transfer existence information of all cache lines from the first-type entry to at least one new second-type entry and may remove the first-type entry.

When a second transition condition is met, a second table transition operation may be performed by the control circuit 122 in the snoop filter 120 to transfer at least a portion (i.e., part or all) of an existing second-type entry transit to at least one new first-type entry in the storage device 124. For example, if a second-type entry is created to record information indicative of at least one cache line available in multiple caches and one or more specific cache lines included in the at least one cache line become unique cache lines each being only available in a single cache later, the control circuit 122 may transfer existence information of the specific cache line(s) from the second-type entry to at least one new first-type entry without removing the second-type entry and may update the vector fields of the second-type entry correspondingly. For another example, if a second-type entry is created to record information indicative of at least one cache line available in multiple caches and one or more specific cache lines included in the at least one cache line become unique cache lines each being only available in a single cache later, the control circuit 122 may transfer existence information of all of the at least one cache from the second-type entry to at least one new first-type entry and may remove the second-type entry.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A snoop filter for a multi-processor system, comprising:
    a storage device; and
    a control circuit, arranged to manage at least a first-type entry and at least a second-type entry stored in the storage device; wherein the first-type entry is configured to record information indicative of a first cache of the multi-processor system and first requested memory addresses that are associated with multiple first cache lines each being only available in the first cache; and the second-type entry is configured to record information indicative of multiple second caches of the multi-processor system and at least a second requested memory address that is associated with a second cache line being available in each of the multiple second caches.

2. The snoop filter of claim 1, wherein the first-type entry has a first data structure, and the second-type entry has a second data structure different from the first data structure.

3. The snoop filter of claim 2, wherein the first-type entry with the first data structure comprises:
    an address field, arranged to store a common part of K memory addresses, wherein the K memory addresses comprise the requested first memory addresses, and K is a positive integer larger than one; and
    a vector field, arranged to store K indication bits, wherein the K indication bits are arranged to indicate existence of K cache lines in the first cache, respectively, and the K cache lines comprise the multiple first cache lines; and
    a cache index field, arranged to indicate the first cache.

4. The snoop filter of claim 2, wherein the multi-processor system comprises N caches, and the second-type entry with the second data structure comprises:
    an address field, arranged to store a common part of M memory addresses, wherein the M memory addresses comprise at least the requested second memory address, wherein N is a positive integer larger than one and M is a positive integer larger than or equal to one;
    M vector fields, corresponding to the M memory addresses, respectively, wherein each of the M vector fields comprises N indication bits arranged to indicate existence of a same cache line in the N caches, respectively.

5. The snoop filter of claim 1, wherein the storage device comprises a plurality of configurable entries each having a same bit length; and the control circuit is further arranged to adaptively configure a first configurable entry as the first-type entry and adaptively configure a second configurable entry as the second-type entry.

6. The snoop filter of claim 1, wherein the storage device comprises at least a first sub-storage device and a second sub-storage device, the first sub-storage device has entries in a first bit length, and the second sub-storage device has entries in a second bit length different from or equal to the first bit length; and the control circuit is further arranged to store first-type entries in the first sub-storage device and store second-type entries in the second sub-storage device.

7. The snoop filter of claim 1, wherein the control circuit is further arranged to transfer at least a portion of the first-type entry to at least another second-type entry in the storage device.

8. The snoop filter of claim 1, wherein the control circuit is further arranged to transfer at least a portion of the second-type entry to at least another first-type entry in the storage device.

9. The snoop filter of claim 1, wherein the first-type entry is stored in the storage device according to one of direct-mapped entry placement, set-associative entry placement and fully-associative entry placement.

10. The snoop filter of claim 1, wherein the second-type entry is stored in the storage device according to one of direct-mapped entry placement, set-associative entry placement and fully-associative entry placement.

11. A snoop filter for a multi-processor system, comprising:
    a storage device, comprising a plurality of configurable entries; and
    a control circuit, arranged to adaptively configure at least one configurable entry as at least one first-type entry with a first data structure and adaptively configure at least one configurable entry as at least one second-type entry with a second data structure different from the first data structure, wherein the at least one first-type entry and the at least one second-type entry are arranged to record statuses of cache lines available in caches of the multi-processor system.

12. A snoop filter for a multi-processor system, comprising:
    a storage device; and
    a control circuit, arranged to manage a plurality of entries stored in the storage device, wherein the entries are arranged to record statuses of cache lines available in caches of the multi-processor system, the entries comprise at least a first entry and a second entry, the first entry is stored in the storage device according to a first entry placement, the second entry is stored in the storage device according to a second entry placement, and the first entry placement and the second entry placement have different associativity.

13. A snoop filtering method employed by a multi-processor system, comprising:
  recording at least a first-type entry in a storage device, wherein the first-type entry is configured to record information indicative of a first cache of the multi-processor system and first requested memory addresses that are associated with multiple first cache lines each being only available in the first cache; and
  recording at least a second-type entry in the storage device, wherein the second-type entry is configured to record information indicative of multiple second caches of the multi-processor system and at least a second requested memory address that is associated with a second cache line being available in each of the multiple second caches.

14. The snoop filtering method of claim 13, wherein the first-type entry has a first data structure, and the second-type entry has a second data structure different from the first data structure.

15. The snoop filtering method of claim 14, wherein the first-type entry with the first data structure comprises:
  an address field, arranged to store a common part of K memory addresses, wherein the K memory addresses comprise the requested first memory addresses, and K is a positive integer larger than one;
  a vector field, arranged to store K indication bits, wherein the K indication bits are arranged to indicate existence of K cache lines in the first cache, respectively, and the K cache lines comprise the multiple first cache lines; and
  a cache index field, arranged to indicate the first cache.

16. The snoop filtering method of claim 14, wherein the multi-processor system comprises N caches, and the second-type entry with the second data structure comprises:
  an address field, arranged to store a common part of M memory addresses, wherein the M memory addresses comprise at least the requested second memory address, wherein N is a positive integer larger than one and M is a positive integer larger than or equal to one; and
  M vector fields, corresponding to the M memory addresses, respectively, wherein each of the M vector fields comprises N indication bits arranged to indicate existence of a same cache line in the N caches, respectively.

17. The snoop filtering method of claim 13, wherein the storage device comprises a plurality of configurable entries each having a same bit length; and the snoop filtering method further comprises:
  adaptively configuring a first configurable entry as the first-type entry; and
  adaptively configuring a second configurable entry as the second-type entry.

18. The snoop filtering method of claim 13, wherein the storage device comprises at least a first sub-storage device and a second sub-storage device, the first sub-storage device has entries in a first bit length, and the second sub-storage device has entries in a second bit length different from or equal to the first bit length; and first-type entries are stored in the first sub-storage device and second-type entries are stored in the second sub-storage device.

19. The snoop filtering method of claim 13, further comprising:
  transferring at least a portion of the first-type entry to at least another second-type entry in the storage device.

20. The snoop filtering method of claim 13, further comprising:
  transferring at least a portion of the second-type entry to at least another first-type entry in the storage device.

21. The snoop filtering method of claim 13, wherein the first-type entry is stored in the storage device according to one of direct-mapped entry placement, set-associative entry placement and fully-associative entry placement.

22. The snoop filtering method of claim 13, wherein the second-type entry is stored in the storage device according to one of direct-mapped entry placement, set-associative entry placement and fully-associative entry placement.

23. A snoop filtering method for a multi-processor system, comprising:
  utilizing a storage device, comprising a plurality of configurable entries;
  adaptively configuring at least one configurable entry as at least one first-type entry with a first data structure; and
  adaptively configuring at least one configurable entry as at least one second-type entry with a second data structure different from the first data structure;
  wherein the at least one first-type entry and the at least one second-type entry are arranged to record statuses of cache lines available in caches of the multi-processor system.

24. A snoop filtering method for a multi-processor system, comprising:
  recording a plurality of entries in a storage device, wherein the entries are arranged to record statuses of cache lines available in caches of the multi-processor system, the entries comprise at least a first entry and a second entry, the first entry is stored in the storage device according to a first entry placement, the second entry is stored in the storage device according to a second entry placement, and the first entry placement and the second entry placement have different associativity.

* * * * *